April 14, 1959  H. E. MICHAEL  2,881,994
CONVEX PANEL WING CONSTRUCTION
Filed Nov. 9, 1953
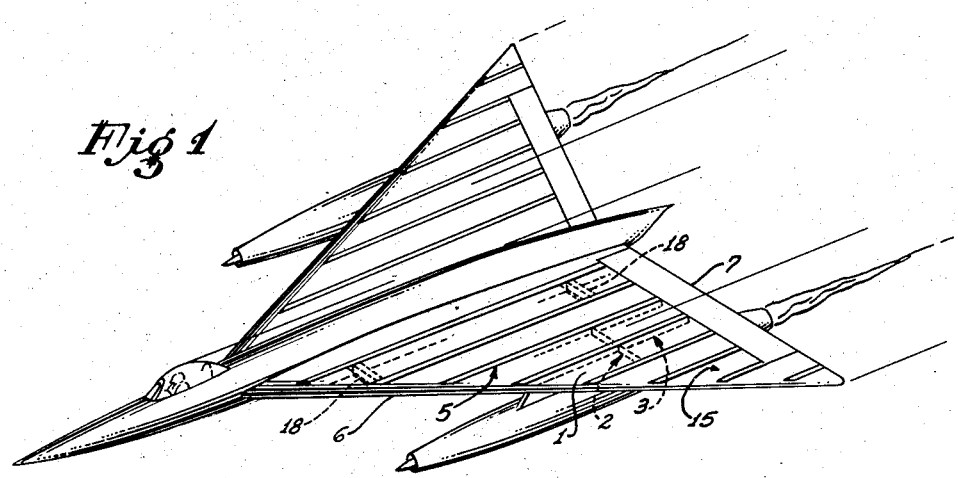
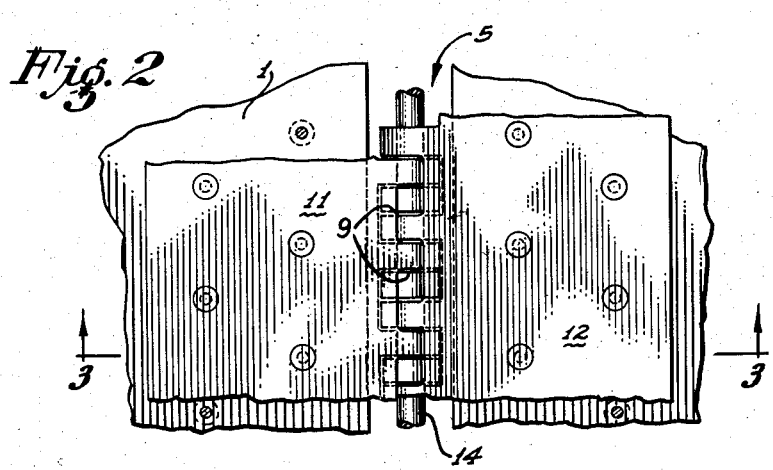
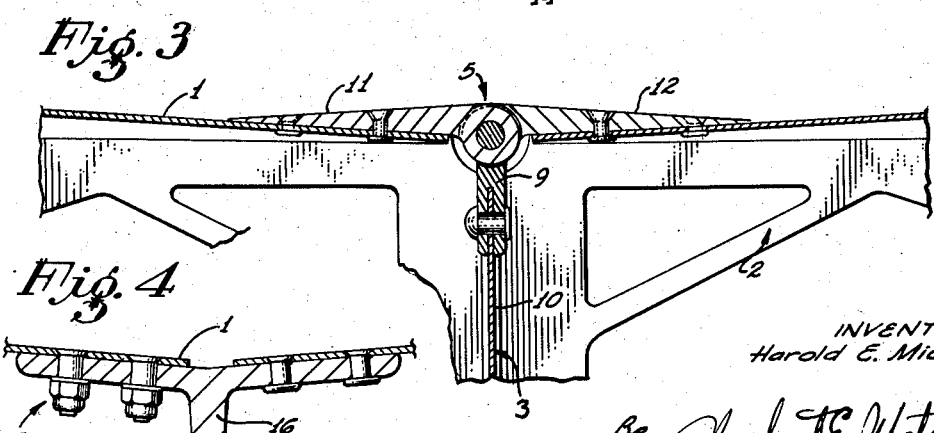
INVENTOR:
Harold E. Michael
By Herbert E. Metcalf
His Patent Attorneys United States Patent Office 2,881,994
Patented Apr. 14, 1959

2,881,994
CONVEX PANEL WING CONSTRUCTION

Harold E. Michael, Hawthorne, Calif., assignor to Northrop Aircraft, Inc., Hawthorne, Calif., a corporation of California Application November 9, 1953, Serial No. 390,924

1 Claim. (Cl. 244—124)

My invention relates to a novel means of securing the wing skin to the wing structure of a delta wing aircraft.

Due to the ever increasing demand for greater aircraft speed it has become necessary to resort to the newer type wing construction, i.e., the delta wing to provide an aircraft capable of flying at or above the speed of sound. Engineering design requires that the strongest and usually the heaviest portion of the delta wing be towards the aft section thereof. Consequently to obtain the best weight-lift ratio for such an aircraft, the remainder of the wing should be relatively light.

Unfortunately, the present delta-type wings have not proved satisfactory. In order to prevent the wing skin from rupturing, the skins have been secured to the wing structure in much the same way as in the conventional straight wing which results in giving to the delta wing a quilt-like surface. This is due to the fact that the skin is secured to the chord-wise members and the spars of the wing structure. The quilting surface is caused by virtue of the fact that a light skin, responsive to pressure variations, is used in the delta wing whereas in the straight wing-type aircraft heavy skin is utilized. Since it proves to be aerodynamically undesirable to have the quilt-like wing surface, a heavier skin, which is more rigid than the light weight skin, must be resorted to with its accompanying increase in overall aircraft weight.

It is therefore an object of my invention to provide a novel method of securing a light weight wing skin to a delta wing frame structure to insure a minimum weight-lift ratio for the wing.

Another object of my invention is to provide a light weight skin delta wing having the skin secured to the wing structure without rendering an objectionable quilt-like surface to the wing.

Other objects and uses will manifest themeselves in view of the subsequent disclosure and drawings wherein:

Figure 1 is a perspective view of an aircraft having a delta wing employing one embodiment of the novel construction as disclosed herein.

Figure 2 is a fragmentary plan view of the delta wing of Figure 1 showing the attachment of the wing panels by means of a continuous-type hinge.

Figure 3 is a cross-sectional view along the line 3—3 of Figure 2.

Figure 4 is another embodiment employing fixed means of attaching the skin panels to the chord-wise rib members.

Referring now to the drawings, a light gage skin in the form of panels 1 is secured to the wing structure 2 along the chord-wise rib members 3 thereof so that tension stresses exerted on the skin panels 1 will be in a direction perpendicular to that of the chord-wise rib member 3. Disposed along the respective rib members 3 are continuous type hinges 5 extending from the wings leading edge 6 to the trailing edge 7. Each of the hinges 5 include an attach element 9 and a pair of leaf members 11 and 12 as shown in Figures 2 and 3. The attach elements 9 are secured to an upstanding web 10 of the rib members 3 as by riveting or the like while the leaf members 11 and 12, which are tapered in transverse cross-section as shown in Figure 3, are attached to adjacent skin panels 1. The hinge elements 9, 11, and 12, are pivotally mounted on a pin member 14 in a conventional manner as shown in Figures 2 and 3.

The skin panels 1 may be attached to the chord-wise rib members 3 so that it presents an initially flat wing surface 15. Any pressure differential between the wing interior and that of the exterior will tend to cause the skin panels 1 to bow outwardly substantially as shown in Figure 3. In order to eliminate some of the stresses at the point of connection between the skin panels 1 and the members 3, the hinges 5, having the tapered leaves 11 and 12, has been utilized thus eliminating the bending stresses along the skin panels 1 and placing the latter 1 in tension only. If structural requirements dictate otherwise, the skin panels 1 may be directly riveted to the extruded cap members 16 of the chord-wise rib members 3 as best seen in Figure 4. Where accessibility to the wing interior is required, the panels may be releasably secured to the extruded cap 16 by a nut and bolt assembly 17.

Where the skin panels 1 have each been preformed with a bow shape already placed therein it is possible to use a lighter gage skin that where there is no preforming of the wing. This is due to the fact that the skin panels 1 will not be stressed or bowed to any appreciable extent over the preformed shape while the aircraft is in flight. To the extent that it will be, skin panels 1 may be selected so as to withstand the additional tension forces exerted thereon.

The arcuated wing surface as proposed will not interfere with the aerodynamic integrity of the wing 2 since the airflow is directed from the leading edge 6 to trailing edge 7 of the wing 2 and such flow is uninterrupted in its path across the wing surface 15 at any given plane.

The skin panels 1 may be secured to the wing spars 18 adjacent the trailing edge 7 and the leading edge 6 so as to cover the initial leading edge 6 and trailing edge 7 with separate skin members if desired for interior wing accessibility.

While in order to comply with the statute, the invention has been described in language more or less specific as to structural features, it is to be understood that the invention is not limited to the specific features shown, but that the means and construction herein disclosed comprise a preferred form of putting the invention into eflect, and the invention is therefore claimed in any of its forms or modifications within the legitimate and valid scope of the appended claim.

What is claimed is:

In a high speed aircraft, a delta wing comprising: a frame structure for said wing having chord-wise members extending from the leading to the trailing edge thereof; light gage skin panels disposed on said structure and secured with respect to said structure only at panel edges positioned along said members; and a plurality of continuous-type hinges extending from said leading to said trailing edge, said hinges comprising a vertical portion rigidly secured to said chord-wise members and two horizontal portions disposed over the top surface of said edges and rigidly secured thereto, said vertical and horizontal portions being pivotally pinned together to permit said skin to arcuate between said chord-wise members without rupture.

References Cited in the file of this patent

UNITED STATES PATENTS

| | | |
|---|---|---|
| 1,159,720 | Simpson | Nov. 9, 1915 |
| 1,817,653 | Thaden | Aug. 4, 1931 |
| 2,167,686 | Schmidt | Aug. 1, 1939 |
| 2,375,951 | Simon | May 15, 1945 |
| 2,427,853 | Goodlett | Sept. 23, 1947 |
| 2,432,396 | Earhart | Dec. 9, 1947 |
| 2,473,728 | Rutledge | June 21, 1949 |

FOREIGN PATENTS

| | | |
|---|---|---|
| 450,395 | Great Britain | July 9, 1936 |
| 573,959 | Germany | Apr. 7, 1933 |

OTHER REFERENCES

"Aviation Week" Magazine, July 4, 1949, page 21.